May 27, 1941.    W. C. GROENIGER    2,243,203
FLUSH TANK VALVE
Filed May 2, 1939
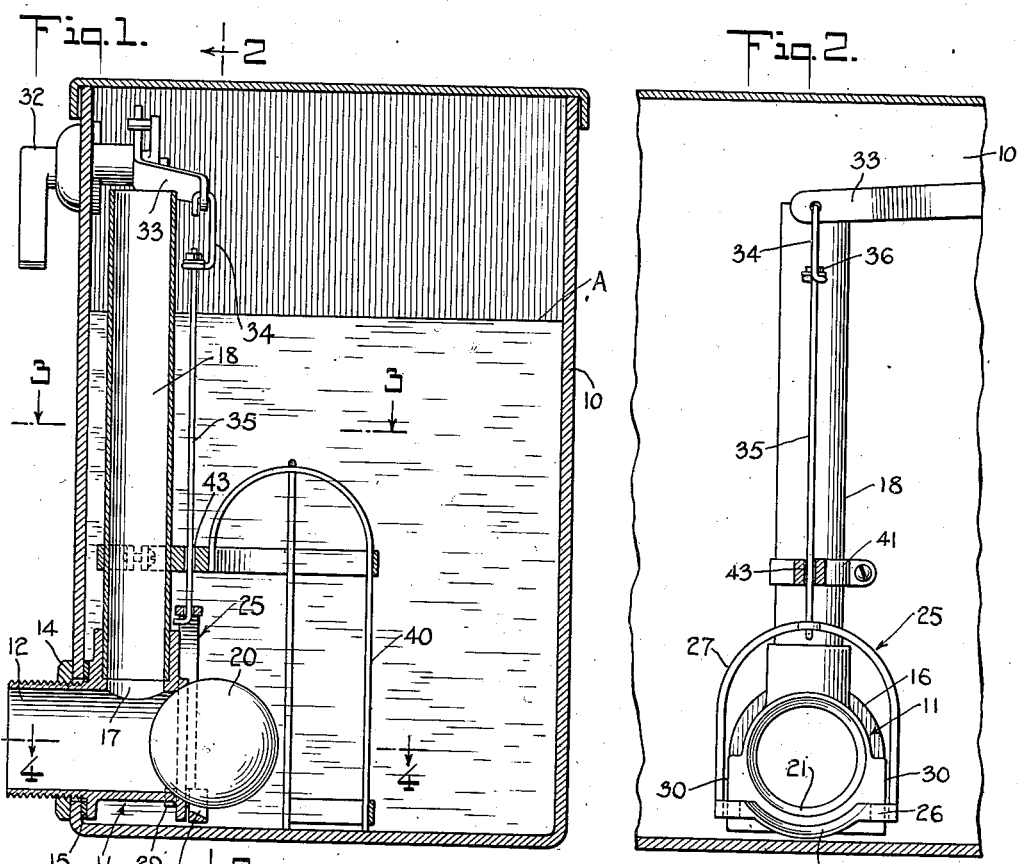
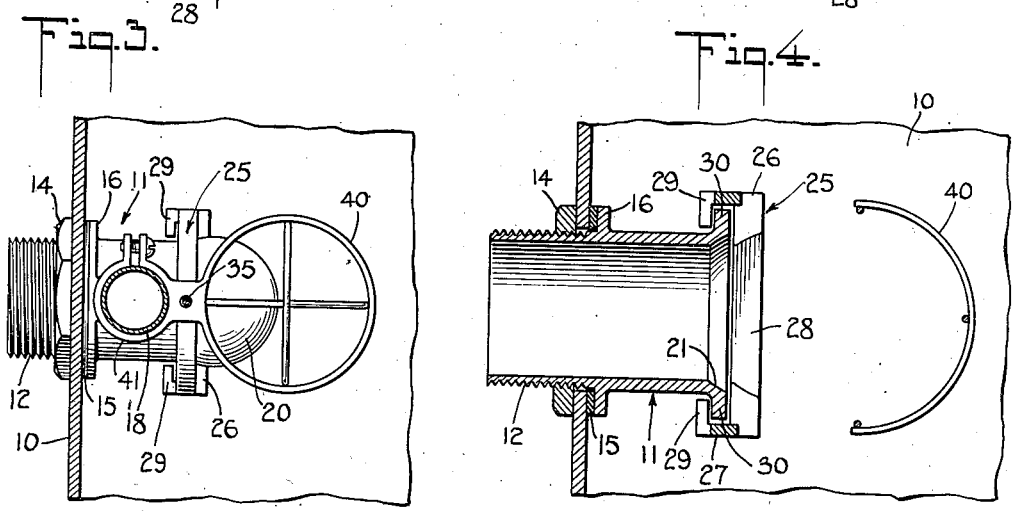
INVENTOR
William C. Groeniger
BY
Henry J. Rueke
HIS ATTORNEY Patented May 27, 1941

2,243,203

UNITED STATES PATENT OFFICE 2,243,203

FLUSH TANK VALVE

William C. Groeniger, Columbus, Ohio, assignor to John B. Pierce Foundation, New York, N. Y., a corporation of New York Application May 2, 1939, Serial No. 271,315

6 Claims. (Cl. 4—57)

The present invention relates to plumbing fixtures, and particularly to improved valve means for flush tanks or the like.

Pursuant to the present invention, the flushing valve may comprise a valve body having a suitable valve seat formed in a wall thereof, said valve seat being arranged for cooperation with a buoyant spherical closure member normally in engagement with said valve seat to prevent outflow of water from the flush tank, but releasable as desired, to permit the substantially complete drainage of water from the tank.

It is a feature of the present invention that the valve operator means are disposed entirely externally of the flush valve body, thus freeing the flow passages within said valve body from any obstructions or mechanical devices commonly found in conventional flushing valves, and making said operator means readily accessible for replacement or repair. To this end, the valve operator means may comprise a suitable mechanism arranged externally of the valve body, and slidably engageable with the spherical valve member when the same is in valve closing position. Displacement of the valve operator is effective to cam the spherical valve member out of seated position, whereupon its buoyancy causes it to float away from the valve seat to permit drainage of the flush tank.

Desirably, said operator mechanism means includes a transverse bar, plate or the like, disposed in suitable relationship to the ball member, and movable relatively thereto. Said transverse bar has a sloping surface operating as a camming surface against the underside of the spherical valve member. By forming said bar with an arcuate center portion substantially concentric with the valve seat, the bar, upon resuming normal position after the initiation of flow from the flush tank, serves to guide the ball member into seated position at the termination of water flow from the tank.

Among the objects of the invention, therefore, are: an improved flushing valve of the ball closure type, having simplified means for actuating the ball member thereof; a flushing valve wholly devoid of operating mechanism within the valve body, thereby affording free and unobstructed flow through the valve and providing for replacement or repair of said operating mechanism without dismantling the valve; and an improved operator for flushing valves of the ball closure type, said operator acting upon the ball valve member with minimum of wear on said ball valve member, and effective, at the final stages of water flow from the flush tank, to guide the said ball valve member into seated position.

Other features and advantages will hereinafter appear.

In the accompanying drawing—

Fig. 1 is an elevation, partly in section, of a defecator flush tank provided with a flush valve incorporating the present invention;

Fig. 2 is an elevation of my improved flush valve, the ball member thereof having been removed to more clearly show the operating structure;

Fig. 3 is a plan view taken on the lines 3—3 of Fig. 1; and

Fig. 4 is a sectional view taken on the lines 4—4 of Fig. 1.

Referring to Fig. 1, 10 designates so much of a flush tank for a defecator and the flushing mechanism therefor as is necessary for an understanding of the present invention.

A flush valve 11 is suitably positioned within the tank, preferably proximate the base thereof. The outlet 12 of said valve is shown extending laterally from a front wall, for ultimate communication with the flushing water inlet of a defecator; the tank 10 comprises a reservoir of such amount of flushing water as is necessary for a complete flushing of the defecator. Any conventional means, such as a ball float valve or the like (not shown), may be employed for replenishing the water content of the flush tank, the normal water content being typified in Fig. 1 by the water line A.

The side outlet of the valve 11 is merely typical of a suitable arrangement; the present invention is not restricted to any particular disposition or location of said valve outlet.

The valve 11 may be secured to a wall of the flush tank in any manner affording suitable support and water-tight relationship. There is illustrated a nut 14, with suitable gasket means 15 interposed between the wall of the flush tank and a bearing shoulder 16 provided on the flush valve 11. An overflow port 17 of the valve 11 has communicating therewith an upstanding overflow pipe 18, the open end of which is disposed suitably above said normal water level A.

Pursuant to the present invention, the flush valve 11 is of the ball type, the ball 20 thereof being operated, as later specifically described, to control water flow from the tank 10 to the defecator for flushing the same.

Desirably, the ball 20 is a hollow sphere of suitable size and buoyancy, arranged to seat in valve closing status against a valve seat 21 formed in a wall of the valve 11. Said valve seat is machined to have a diameter and wall curvature substantially matching that of a spherical segment of the ball 20, said segment having a maximum diameter suitably less than the maximum diameter of the ball 20, as is disclosed in Fig. 1.

For engaging the ball 20 for forcibly bringing the same out of engagement with the valve seat 21, the present invention contemplates slidable ball operator means 25, resembling a stirrup in configuration, and having a lowermost cam bar 26 formed with a central portion arcuately curved to a suitable radius, and desirably concentric with said valve seat. Said bar 26, as shown in Figures 2 and 4, is provided with a sloping cam face 28 of substantial depth, the angle of slope of which substantially conforms to the curvature of the ball 20. An arched support 27 is provided for operative association with actuating means, as later described. The spacing and configuration of bar 26 and support 27 disposes these elements entirely outside of the zone of valve seat 21, and further permits the free movement of ball 20 into and out of valve seating position. Water flow into and through the valve 11 is, therefore, not encumbered by any operating mechanism internally or externally of the valve body.

For guiding ball operator 25 for movement with respect to valve 11 and to maintain the substantially concentric relationship with respect to valve seat 21, there may be provided a pair of inwardly turned arms 29, see Fig. 4, slidably embracing the illustrated vertical wall portions 30 of the valve 11.

In the embodiment illustrated in Figure 1, the bar 26 of the operator 25 is disposed beneath the ball 20 when said ball is in valve-closing position. It is apparent, therefore, that the vertical displacement of operator 25 with respect to the longitudinal axis of valve 11 brings the sloping face 28 of the bar 26 into engagement with the ball 20 and upon continued displacement, said sloping face cooperates with the arcuately curved surface of the valve seat 21, to cam or "roll" the ball 20 out of its seated position, whereupon the buoyancy of the ball 20 causes it to float upwardly away from the valve seat 21, opening the valve 11 to the free and unencumbered flow of water from the tank 10 into and through the outlet 12.

The substantially matching curvatures of the valve seat 21 and the surface 28 of the bar 26 are operative to effect such camming action without scoring the surface of the valve, such matching curvatures precluding the shearing effect which a flat or relatively sharp edged bar 26 might impose upon the under side of the ball 20 during the upward displacement of the operator 25.

To displace the operator 25 in the manner aforesaid, the said operator may be operatively associated with any suitable handle-provided mechanism 32, the associated and pivotally mounted lever 33 of which engages, by means of a link 34, a freely slidable rod 35 secured to the support 27 of operator 25, as by passage through an aperture therein and hooked engagement with the underside thereof. A nut 36 at the upper end of the rod 35 affords a means of connection of said link 34 therewith in a manner affording suitable adjustment.

Suitable actuation of the handle of mechanism 32 affords a clockwise rotation of pivoted lever 33 with respect to Fig. 2, and displaces operator 25 upwardly with respect to the valve 11. Such upward movement is guided, and restrained against turning or other undesirable displacement by the cooperation of arms 29 with the slide faces 30.

To restrain the movement of the ball 20 after its release from valve-closing, i. e., Fig. 1, position, there is provided a suitable cage 40, secured, as by the clamp 41 illustrated, to the hush pipe 18. It is advantageous to employ a central member 42 of said clamp as a guiding and bearing means for the rod 35, and, therefore, said central portion may be provided with an aperture 43, of diameter affording the free slidable movement of the rod 35 therein.

Upon the release of the handle of the mechanism 32, the cumulative weight of the lever 33 and the operator 25 causes said operator to return to its normal position in advance of the complete outflow of water from the tank 10. When the flush tank has been substantially completely emptied of its water content, the ball 20 is carried by the water stream into forcible water-sealing engagement with the valve seat 21, in which position it remains during the stage of refilling the flush tank and until again forcibly removed through the operation of the flushing valve mechanism.

It is to be noted, see Fig. 1, that the arcuate central portion of cam bar 26 and the upwardly sloping face 28 thereof are disposed adjacent the lower wall of the tank 10, and thus act as an inclined step which guides the ball 20 into seated engagement with the valve seat 21, insuring smoothness and uniformity of seating action.

Among the features of the present invention, therefore, are the total absence of operating mechanism within the body of valve 11 or the overflow pipe 18, and the ready accessibility of all operating parts. All mechanical operating parts may be inspected, replaced, or repaired, without the dismantling or removal of the valve body.

Whereas I have described my invention by reference to specific forms thereof, it will be understood that many changes and modifications may be made without departing from the spirit of the invention.

I claim:

1. A valve for flush tanks or the like, comprising, in combination, a valve body having a valve seat formed in a wall thereof, spherical valve closure means operatively associated with said valve seat, valve operator means associated with said valve body wholly externally thereof for slidable movement along an external face thereof and having means for engaging said spherical valve closure means, and means for displacing said valve operator means in a plane at right angles to the axis of said valve seat to move said spherical valve closure means out of valve closing position.

2. In a valve for flush tanks or the like, the combination with a valve body having a valve seat formed in a wall thereof and buoyant ball means operatively associated with said valve seat to control water flow through said valve, of valve operator means operatively associated with said ball to move the same out of valve closing position, said valve operator means including a structure slidably mounted upon said valve body at an external wall thereof and surrounding said ball when the same is in valve closing status, said structure being provided with a ball engaging member formed with an arcuately curved central portion substantially concentric with said valve seat, and means operatively associated with said operator means to displace the same in a plane substantially at right angles to the axis of said valve seat to bring the arcuately curved central portion of said ball engaging member into contact with said ball to move the same out of valve closing status.

3. In a valve for flush tanks or the like, the combination with a valve body having a valve seat formed in a wall thereof and buoyant ball means operatively associated with said valve seat to control water flow through said valve, of valve operator means operatively associated with said ball to move the same out of valve closing position, said valve operator means including a structure slidably mounted upon said valve body at an external wall thereof and surrounding said ball when the same is in valve closing status, said structure being provided with a ball engaging member formed with an arcuately curved central portion substantially concentric with said valve seat, said arcuately curved portion having a face of substantial depth converging inwardly in the direction of said valve body, and means operatively associated with said operator means to displace the same in a plane substantially at right angles to the axis of said valve seat to bring the ball engaging member into contact with said ball to move the same out of valve closing status.

4. In a valve for flush tanks or the like, the combination with a valve body having a valve seat formed in a wall thereof and buoyant ball means operatively associated with said valve seat to control water flow through said valve, of valve operator means operatively associated with said ball to move the same out of valve closing position, said valve operator means including a structure slidably mounted upon said valve body at an external wall thereof and surrounding said ball when the same is in valve closing status, said structure being provided with a ball engaging member formed with an arcuately curved central portion substantially concentric with said valve seat, said arcuately curved portion having a curved face of substantial depth substantially conforming to the curvature of said ball valve closure means, and means operatively associated with said operator means to displace the same in a plane substantially at right angles to the axis of said valve seat to bring the ball engaging member into contact with said ball to move the same out of valve closing status.

5. In a valve for flush tanks or the like, the combination with a valve body arranged at a low point of said tank and having a valve seat formed in a wall thereof, buoyant ball means operatively associated with said valve seat to control water flow through said valve, and cage means disposed within said tank adjacent said valve body to restrain the movement of said buoyant ball, of valve operator means operatively associated with said ball to move the same out of valve closing position, said operator means including a framework mounted upon said valve body and in guided slidable relationship with an external face thereof, said structure surrounding said ball when the same is in valve closing position, said framework being provided with a ball engaging member normally disposed beneath said ball and adjacent the bottom wall of said flush tank, said ball engaging member having a central portion arcuately curved concentrically with said valve seat, and having a curved camming face substantially matching the curvature of said ball and converging inwardly in the direction of said valve seat, and means including vertically displaceable means operatively associated with said valve operator means to move said ball engaging member into engagement with said ball to cam the same outwardly out of engagement with said valve seat, said cage means being arranged to guide said vertically displaceable means in its directions of displacement.

6. In a valve for flush tanks or the like, the combination with a valve body arranged at a low point of said tank and having a valve seat formed in a wall thereof, buoyant ball means operatively associated with said valve seat to control water flow through said valve, cage means within said tank adjacent said valve body to confine said ball means and support means for said cage means, of valve operator means operatively associated with said ball to move the same out of valve closing position, said operator means including a framework mounted upon said valve body and in guided slidable relationship with an external face thereof, said structure surrounding said ball when the same is in valve closing position, said framework being provided with a ball engaging member normally disposed beneath said ball and adjacent the bottom wall of said flush tank, said ball engaging member having a central portion arcuately curved concentrically with said valve seat, and having a curved camming face substantially matching the curvature of said ball and converging inwardly in the direction of said valve seat, and means including a vertically displaceable rod operatively associated with said valve operator means and guided in its directions of displacement by said cage support means to move said ball engaging member into camming engagement with said ball to urge the same outwardly away from engagement with said valve seat.

WILLIAM C. GROENIGER.